March 29, 1966  K. J. KARNATH ETAL  3,242,903
AUTOMATIC MILKING APPARATUS
Filed Oct. 7, 1963
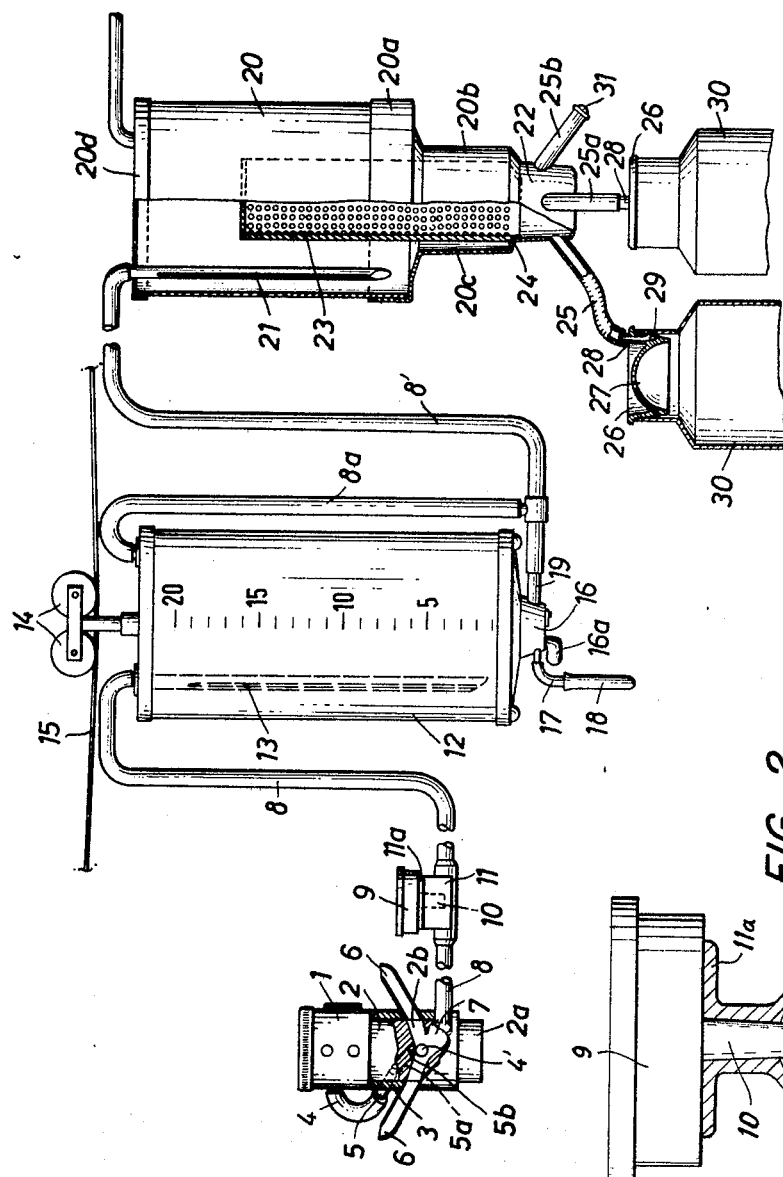
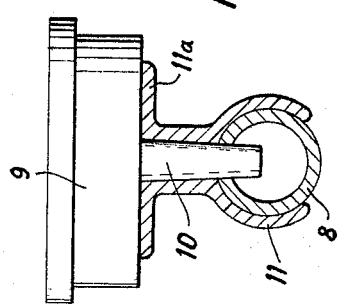
INVENTORS
Klaus Jürgen Karnath
Günther Karnath
Kurt Karnath
BY Michael J. Striker United States Patent Office 3,242,903
Patented Mar. 29, 1966

3,242,903
AUTOMATIC MILKING APPARATUS
Klaus Jürgen Karnath, Wiesbaden, Günther Karnath, Unna, and Kurt Karnath, Wiesbaden, Germany, assignors Kurt Karnath, Wiesbaden, Germany, and Max H. Hoepli, New York, N.Y.
Filed Oct. 7, 1963, Ser. No. 314,562
Claims priority, application Germany, Oct. 5, 1962, K 47,899; Nov. 2, 1962, K 48,122; Dec. 12, 1962, K 48,444, K 48,445
6 Claims. (Cl. 119—14.11)

The present invention relates to milking apparatus.

As is well known, the supply of labor in agriculture is diminishing and there has long been a requirement for automatic machines to perform operations so that a minimum number of workers is required.

In the case of dairy operations in connection with the milking of cows, it has long been desired to make the operations as automatic as possible so that, for example, it is necessary only to attach the milking apparatus to the cow and remove it from the cow, so that in this way a relatively large number of cows can be taken care of by a single person with all of the milking operations performed by a single person for a relatively large number of cows. The situation is rendered rather complex because much more is involved than simply obtaining milk from the cows. It is necessary to measure the amount of milk received from each cow and it is also necessary to take test samples of milk, without interrupting the milking operations, and up to the present time there is no machine available which can perform all of these operations in an automatic and fully satisfactory manner.

One of the difficulties encountered is that the milking apparatus, at its portion which is attached to the cow, is simply suspended from the cow so that it is unavoidable that the apparatus will fall from the cow from time to time, and because the apparatus cannot remain clean under these conditions while cleanliness of course is essential, there is an extremely undesirable interruption in the automatic operations caused by the necessity of cleaning the apparatus whenever it falls from the cow. Furthermore, the necessity of measuring the amount of milk received from a given cow and at the same time taking a sample of the milk has prevented the operations from being fully automatic. In addition, there are the problems of undesirable foaming of the milk since it is unavoidably combined with air and also there is difficulty encountered in connection with the filling of the final milk containers since if they are filled simultaneously it is necessary to judge quite accurately how much milk will be received so that the number of containers to be simultaneously filled can be chosen in such a way that they will all be filled at the end of the operation. Since it is next to impossible to accurately determine how much milk will be received, there is the necessity of interrupting the final operations by taking milk from one of a plurality of partly filled cans and distributing it among the others so as to obtain a number of completely filled cans.

It is accordingly a primary object of the present invention to provide a milking apparatus which is automatic to an extent far greater than as hitherto been the case so that in this way each individual worker can take care of a far greater number of cows and the extent of automatic operation is very greatly increased.

Furthermore, it is an object of the present invention to provide a structure which will automatically prevent the apparatus from becoming unclean should it fall from the cow so that it becomes unnecessary in such an event to interrupt the operations for a considerable period of time in order to clean the apparatus.

It is also an object of the present invention to provide a structure capable of automatically measuring the milk received from each cow without interrupting the operations.

In addition, it is an object of the present invention to provide a structure which makes it possible to take a sample of the milk for test purposes, also without interrupting the automatic operations.

It is furthermore an object of the present invention to combine with structure for accomplishing the above objects a structure which is capable of automatically filling a series of cans in sequence so that the milk will flow to a given can only after it has completely filled the immediately preceding can, so that if there are too many cans, then those which are not required will simply remain empty and it will become unnecessary to redistribute the milk among the cans at the end of the operation.

Furthermore, it is an object of the present invention to provide an apparatus which can be quickly and easily moved from cow to cow.

Furthermore, it is an object of the present invention to provide an apparatus which maintains undesirable foaming to a minimum.

With the above objects in view the invention includes, in a vacuum-operated milking apparatus, a passage means formed with milk and air passages and adapted to be connected to a cow for receiving milk from the cow, and a conduit means communicating with the passage means for receiving the milk and air therefrom. A measuring container means receives the milk and air from the conduit means, and an additional conduit means connects the measuring container means to a filter container means in which the milk is filtered before it is collected and distributed in sequence to a plurality of cans filling each can before flowing into the next can. The measuring container means is capable of indicating the amount of milk received from each cow without interrupting the operations, and with this measuring container means is associated a valve means which permits a sample of the milk to be delivered to a test tube, without interrupting the operations. The passage means forms part of an assembly which is connected to the cow and which includes a pulsator, and this assembly has a structure which automatically closes all of the air and milk passages in the event that the assembly connected to the cow falls, and so that in this way all passages are maintained clean and a considerable amount of time is saved because there is no necessity for extensive cleaning of the apparatus should it fall from the cow.

The novel features which are considered as characteristic for the invention are set forth in particular in the appended claims. The invention itself, however, both as to its construction and its method of operation, together with additional objects and advantages thereof, will be best understood from the following description of a specific embodiment when read in connection with the accompanying drawing in which:

FIG. 1 is a schematic, partly sectional illustration of one possible embodiment of a structure according to the invention; and FIG. 2 is a transverse sectional view illustrating the manner in which a control valve assembly is connected to a conduit.

Referring now to the drawing, the assembly shown at the left thereof forms the passage means of the invention which includes milk and air passages. There are four tubes 6, of which only two are visible in the drawing, and these tubes 6 are connected to hoses, respectively, which in turn are connected in a well known manner to the teats of the udder of the cow, and when thus connected the assembly shown at the left of the drawing is simply suspended from the cow. This assembly includes the pulsator 1 of conventional construction.

The passage means includes an elongated cylindrical body 2 which is fixed to the bottom of the pulsator and extends downwardly therefrom. The cylindrical body 2 is formed with four bores 2b passing therethrough and respectively corresponding to and communicating with the four tubes 6. A collecting passage 7 is also formed in the body 2 and communicates with all of the passages 2b so that the milk flowing into these passages will collect and flow down through the passage 7. A conduit means 8 communicates with the passage 7 and includes a tubular portion which directly cooperates with the passage 7. In addition, the body 2 is formed with a passage 5a which communicates with the tubular extension 5 which is connected by a small hose element 4 to the pulsator, the pulsator allows exterior air passing through the tube 4 into the tube 5 and of course from the latter through the passage 5a, the latter also communicating with the collecting passage 7 as shown at 4' in the drawing.

The left tubular portion of the conduit means 8, the several tubes 6, and the tube 5 are all carried by a cylindrical sleeve 3 which is formed with openings from which the several tubes extend, and when mounted in the illustrated operative condition, these openings of sleeves 3 are respectively aligned with the several passages of the body 2 so that the several tubes will communicate with these passages in the manner described above. The sleeve 3 frictionally surrounds the cylindrical body 2 so that while it will by friction remain in its operative condition, nevertheless it is capable of slipping with respect to the body 2 when acted upon by a force which is sufficient to overcome the friction. With the passage means described above, the milk and air will of course be received in the conduit means to flow therealong away from the body 2. It is to be noted that the bottom end 2a of the body 2 extends downwardly beyond the sleeve 3 through a substantial distance. Should the assembly shown at the left of the drawing fall from the cow, then of course the extending portion 2a of the body 2 will strike the floor and this will provide an impact causing the body 2 and the pulsator to suddenly stop moving while the inertia of the sleeve 3 will continue the movement thereof overcoming the friction between the body 2 and the sleeve 3 so that the latter will automatically shift under these circumstances, and the frictional contact of the parts are so designed that if the passage means falls from the cow, the sleeve 3 will automatically shift along the body 2 by a distance sufficient to displace the several openings of the sleeve 3 beyond the several passages with which they were aligned so that the sleeve 3 will now automatically close all of these passages, and thus the apparatus will remain clean and the operations will not require an interruption for the purpose of extensive cleaning of the apparatus. It is to be noted that the passage 5a is of a smaller cross sectional area than the other passages and that the opening of the sleeve 3 which communicates with the tube 5 is smaller than the other openings, so that before the passages 2b and 7 are fully closed, the passage 5a will first be fully closed so that initially the pulsator is shut off from the rest of the apparatus and then immediately thereafter the passages 2b and 7 will be closed, so that all of the milking connections will be closed. In this way the apparatus cannot become unclean.

Directly in the region of the above-described structure is located a pressure indicating reducing valve 9 which in known installations is located in the region of the suction pump. The arrangement of the invention is however of considerable advantage since the assembly 9 will give an indication of the extent of vacuum in the immediate vicinity of the milking apparatus and suitable controls can be provided at this region where the controls are far more effective. The valve assembly 9 includes a downwardly directed frustoconical tubular extension 10 and the conduit means 8 has a rigid portion formed with an opening through which the tubular extension 10 extends in a manner providing a tight connection between the member 10 and the conduit means 8 so that in this simple way the instrument 9 is attached to the conduit means 8. At the lower wall of the instrument 9 a dish-like part of a sleeve of elastic plastic material is fixed as by being glued thereto, and this sleeve is provided with a pair of springy extensions 11 in the form of a pair of leaf springs which grip the conduit 8, the latter passing between and being gripped by these leaf springs 11 so that in this way the instrument 9 is supported on and connected to the conduit 8 in a fluid-tight manner.

The conduit means 8 terminates in an elongated tubular portion 13 located within a measuring container means 12. In order to avoid spraying and foaming of the milk, the bottom open end of the tubular portion 13 of the conduit means is located close to the bottom wall of the container means 12. The conduit means 8 extends fluid-tightly through an opening in the cover of the container means 12, this cover being fixed to the cylindrical portion of the container means so that the latter will hang from the cover and the cover itself is connected through suitable brackets to a pair of rollers 14 which are supported on a cable 15 so that the apparatus can very easily be moved from one operating position to the next operating position. The container means 12 has a transparent cylindrical wall provided with a scale so that the amount of milk received from each cow is readily observable.

The bottom wall of the container means 12 carries a two-way valve means 16 which has a pair of open positions as well as a closed position, and of course while the valve means 16 is closed, the milk will rise up in the container means 12 giving an indication of the amount of milk received from a particular cow. Thus, during the milking of a cow the valve means 16 will be maintained closed so that the amount of milk received from the cow can be determined. However, for a very small fraction of the time during which the milk flows into the container means 12 the handle 16a of the valve means 16 can be manipulated by the operator to place the valve means 16 in one of its open positions in which a very small amount of the milk will flow through the tube 17 into a test tube 18 so that a test sample can be obtained in this way without interrupting the automatic operations. When the milking of a given cow has been completed, the handle 16a is manipulated to place the valve means 16 in the other of its open positions, and now the milk will flow out of the container 12 through a tube 19 which forms part of an additional conduit means 8', the milk now discharging from the container 12 through the additional conduit means 8'. In order to equalize the pressure, the upper part of the container 12 communicates through the conduit 8a with the conduit means 8' as indicated in the drawing.

The milk will now flow through the additional conduit means 8' into an elongated tubular portion 21 which forms the end of the conduit means 8', this tubular portion 21 being fluid-tightly located within a filter container 20 closed by a cover 20d which is connected through the conduit indicated at the upper right portion of the drawing to a vacuum pump, this conduit communicating with the interior of the container 20 so that the interior of the container 20 is evacuated and of course the vacuum acts through the conduit means 8' on the measuring container means 12 and through the latter on the conduit means 8 so that in this way the mixture of milk and air is withdrawn from the passage means which is connected to the cow.

The bottom of the filter container 20 is connected to a stepped assembly which terminates in a lower collecting chamber means 22, the intermediate portion 20b between the collecting chamber 22 and the container 20 having a diameter larger than the connecting chamber 22 but smaller than the filter chamber 20, the bottom end portion 20a of the container 20 being connected to the intermediate portion 20b. On the junction 24 between the collecting chamber 22 and the container portion 20b rests a perforated cylindrical filter 23 surrounded with unillustrated wadding or the like, as is conventional, and the milk which reaches the container 23 through the tube 21 surrounds and is distributed over substantially the entire length of the filter 23 so that in this way a very large filter area is provided. The filter is of course open at its bottom end so that the filtered milk simply flows into the collecting chamber means 22.

As may be seen from the drawing, the tube 25 communicates with the collecting chamber 22 in order to direct milk therethrough to the left container 30 shown in section in the drawing, and then another tube 25a communicates with the collecting chamber 20 and is connected to the latter at an elevation higher than the tube 25, and a third tube 25b also communicates with the collecting chamber 20 and is connected thereto at an elevation which is higher than the connection of the tube 25a to the collecting chamber 22. Of course, any desired number of tubes may be connected to the collecting chamber in this way with all of the tubes connected to the collecting chamber at different elevations thereof.

These distributing tubes are respectively connected to the several containers 30 through cover assemblies 26 which are respectively mounted on the containers 30 and which include downwardly directed hollow portions 27 of substantially hemispherical configuration, the flexible tubes 25, 25a, etc. being connected at their ends distant from the chamber 20 to the tubes 28 of the covers 26, these tubes 28 communicating with openings 29 which pass through the walls of the covers 26 at portions of these walls which are spaced from the necks of the container 30 in the manner shown for the left containers 30 in the drawing.

The milk which first flows into the collecting chamber 22 will rise therein until it reaches the top end of the tube 25 and will then flow through the latter into the left container 30 filling the latter before any milk will reach the tube 25a. Of course, there will be some evacuation of the containers 30 as a result of the low pressure within the filter container 20, and any gas which remains in the container 30 will collect in the hollow portion 27 of the cover 26, so that the milk rises in each container 30 until it can no longer compress a gas into the hollow portion 27, whereupon the milk will then flow through the conduit 25 to fill the latter and thus close the container 30 with the milk itself. Now the milk flowing into the collecting chamber 22 will rise above the lowermost conduit 25 to reach the open end of the next higher conduit 25a, and all of the milk now reaching the collecting chamber 22 will fill the next container 30 before reaching the subsequent container 30. If it is estimated that no additional containers 30 are required, then the unused conduits, such as conduit 25b, are closed by the plugs 31, respectively. The covers 26 are removed from the containers 30 in a sequence which is the reverse of the sequence in which they were filled. When each cover is removed the milk in the conduit connected thereto will flow into the can and in addition the milk in the chamber 22 between this conduit and the next higher conduit will flow into the can and the volume of the upper portions of the cans 30 which receive the covers 26 are made large enough so that when the covers are removed additional milk will flow into each container from the conduit connected thereto and from the connecting chamber 22 to an extent which will almost completely fill the container. Of course the operator will be able to estimate how many cans or containers 30 are required, and if the operator does not guess correctly, then there is no harm done since any extra containers simply will not receive any milk. The operator will always provide one or two more containers 30 than it is estimated will actually be required. Although only two containers 30 are shown in the drawing, it is to be understood that actually a large number of containers may be provided and the collecting chamber 22 can be made as long as desired so that a large number of tubes may communicate therewith all at different elevations.

Thus, it will be seen that with the above described structure an almost fully automatic operation is achieved while at the same time interruptions for cleaning in the case where the apparatus falls from the cow is reduced to a minimum and also it is possible to measure the milk taken from a given cow and to test the milk without any appreciable interruption in the operations, and in addition the structure can very easily be transported from one operating position to the next and also will reduce foaming of the milk to a minimum.

It will be understood that each of the elements described above, or two or more together, may also find a useful application in other types of milking apparatus differing from the types described above.

While the invention has been illustrated and described as embodied in automatic milking apparatus, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a constant-vacuum milking apparatus, the combination of, passage means adapted to be connected to the udder of a cow and having passages for milk and air; first conduit means communicating with said passage means for receiving milk and air therefrom; a container connected to said conduit means for receiving the milk and air therefrom, said container being substantially vertical during operation of the apparatus and having a bottom wall and a closed top, said first conduit means extending through said closed top of said container and having a free end adjacent said bottom wall in the interior of said container so that, as the milk flows from said first conduit means into said container, foaming will be reduced to a minimum, and being further formed with at least one aperture intermediate said free end and said closed top of said container; vacuum-creating means remote from said container; second conduit means connecting said vacuum-creating means with said container adjacent said closed top thereof; third conduit means connecting the bottom of said container with said second conduit means downstream of the connection of the latter with said container; and valve means adapted to selectively place said third conduit means in communication with the interior of said container so that, when said valve means is closed, milk received from said passages will rise in said container and constant vacuum will be maintained in the entire apparatus whereas, when said valve means is open, milk collected in said container will be sucked into said second conduit means downstream of the connection of the latter with said container while constant vacuum is still maintained in said apparatus through cooperation of said second conduit means with said aperture in said first conduit means.

2. In a constant-vacuum milking apparatus, the combination of passage means adapted to be connected to the udder of a cow and having passages for milk and air; first conduit means communicating with said passage means for receiving milk and air therefrom; a container connected to said conduit means for receiving the milk and air therefrom, said container being substantially vertical during operation of the apparatus and having a bottom wall and a closed top, said first conduit means extending through said closed top of said container and having a free end adjacent said bottom wall in the interior of said container so that, as milk flows from said first conduit means into said container, foaming will be reduced to a minimum, and being further formed with at least one aperture intermediate said free end and said closed top of said container; vacuum-creating means remote from said container; second conduit means connecting said vacuum-creating means with said container adjacent said closed top thereof, third conduit means connecting the bottom of said container with said second conduit means downstream of the connection of the latter with said container; and valve means adapted to selectively place said third conduit means in communication with the interior of said container so that, when communication between said third conduit means and said container is blocked, milk received from said passages will rise in said container and constant vacuum will be maintained in the entire apparatus including said first conduit means whereas, when said third conduit means is in communication with said container, milk collected in said container will be sucked into said second conduit means downstream of the connection of the latter with said container while constant vacuum is still maintained in said apparatus through cooperation of said second conduit means with said aperture in said first conduit means.

3. In an apparatus as recited in claim 2, said valve means being a two-way valve having a pair of open positions in one which it provides communication between the interior of said container and said third conduit means; and means communicating with said valve means for placing the latter in communication with a test tube when said valve means is in the other of said open positions thereof so that a sample of the milk in the container will flow to the test tube.

4. In a constant-vacuum milking apparatus, the combination of passage means adapted to be connected to the udder of a cow and having passages for milk and air; first conduit means communcating with said passage means for receiving milk and air therefrom; a container connected to said conduit means for receiving the milk and air therefrom, said container being substantially vertical during operation of the apparatus and having a bottom wall and a closed top, said first conduit means extending through said closed top of said container and having a free end adjacent said bottom wall in the interior of said container so that, as milk flows from said first conduit means into said container, foaming will be reduced to a minimum, and being further formed with at least one aperture intermediate said free end and said closed top of said container; indicator means carried by said container for measuring the amount of milk received therewithin; vacuum-creating means remote from said container; second conduit means connecting said vacuum-creating means with said container adjacent said closed top thereof, third conduit means connecting the bottom of said container with said second conduit means downstream of the connection of the latter with said container; and valve means adapted to selectively place said third conduit means in communication with the interior of said container so that, when communication between said third conduit means and said container is blocked, milk received from said passages will rise in said container and constant vacuum will be maintained in the entire apparatus including said first conduit means whereas, when said third conduit means is in communication with said container, milk collected in said container will be sucked into said second conduit means downstream of the connection of the latter with said container while constant vacuum is still maintained in said apparatus through cooperation of said second conduit means with said aperture in said first conduit means.

5. In a constant-vacuum milking apparatus, the combination of passage means adapted to be connected to the udder of a cow and having passages for milk and air; first conduit means communicating with said passage means for receiving milk and air therefrom; a container connected to said conduit means for receiving the milk and air therefrom, said container being substantially vertical during operation of the apparatus and having a bottom wall and a closed top, said first conduit means extending through said closed top of said container and having a free end adjacent said bottom wall in the interior of said container so that, as milk flows from said first conduit means into said container, foaming will be reduced to a minimum, and being further formed with at least one aperture intermediate said free end and said closed top of said container; indicator means carried by said container for measuring the amount of milk received therewithin; vacuum-creating means remote from said container; second conduit means connecting said vacuum-creating means with said container adjacent said closed top thereof, third conduit means connecting the bottom of said container with said second conduit means downstream of the connection of the latter with said container; valve means adapted to selectively place said third conduit means in communication with the interior of said container so that, when communication between said third conduit means and said container is blocked, milk received from said passages will rise in said container and constant vacuum will be maintained in the entire appartaus including said first conduit means whereas, when said third conduit means is in communication with said container, milk collected in said container will be sucked into said second conduit means downstream of the connection of the latter with said container while constant vacuum is still maintained in said apparatus through cooperation of said second conduit means with said aperture in said first conduit means; and support means supporting said container in said vertical position and for movement from one station to another.

6. In an apparatus as recited in claim 5, said support means including an elongated supporting cable, and a roller assembly rolling on said cable and connected to the cover at the top of said container so that the latter is suspended from said cable and is movable therealong.

References Cited by the Examiner

UNITED STATES PATENTS

| | | | |
|---|---|---|---|
| 1,125,348 | 1/1915 | Lawrence | 119—14.14 |
| 1,408,695 | 3/1922 | Dinesen | 119—14.37 |
| 1,519,827 | 12/1924 | Fuge | 119—14.17 |
| 1,719,395 | 7/1929 | Dugas | 119—14.11 |
| 2,460,426 | 1/1949 | Maes | 119—14.37 |
| 2,509,214 | 5/1950 | Cordis | 119—14.11 |
| 2,603,396 | 7/1952 | Redin et al. | 119—14.18 X |
| 2,616,809 | 11/1952 | Graves | 119—14.18 X |
| 2,641,223 | 6/1953 | Van der Plate | 119—14.14 |
| 2,678,627 | 5/1954 | Kingston | 119—14.11 |
| 2,791,964 | 5/1957 | Reeve | 119—14.05 X |
| 2,982,247 | 5/1961 | Varese et al. | 119—14.11 |

FOREIGN PATENTS 128,091   6/1948   Australia.

SAMUEL KOREN, *Primary Examiner.*

HUGH R. CHAMBLEE, *Examiner.*